US006907849B2

(12) United States Patent
Galvin (10) Patent No.: US 6,907,849 B2
(45) Date of Patent: Jun. 21, 2005

(54) PISTON

(76) Inventor: George Frederic Galvin, 9 Christchurch Road, Sidcup, Kent (GB), DA 15 7HG ( * ) Notice: Subject to any disclaimer, the term of this patent is extended or adjusted under 35 U.S.C. 154(b) by 0 days.

(21) Appl. No.: 10/239,742

(22) PCT Filed: Mar. 30, 2001

(86) PCT No.: PCT/GB01/01467

§ 371 (c)(1),
(2), (4) Date: Dec. 30, 2002

(87) PCT Pub. No.: WO01/75284

PCT Pub. Date: Oct. 11, 2001

(65) Prior Publication Data

US 2003/0136358 A1 Jul. 24, 2003

(30) Foreign Application Priority Data

Mar. 31, 2000 (GB) .............................................. 0007726

(51) Int. Cl.⁷ ................................................ F02B 75/38
(52) U.S. Cl. ................................... 123/48 A; 123/78 B
(58) Field of Search ............................ 123/48 A–48 B, 123/78 A–78 B, 197.4

(56) References Cited

U.S. PATENT DOCUMENTS

| 2,323,742 | A | | 7/1943 | Webster | |
|---|---|---|---|---|---|
| 4,031,868 | A | * | 6/1977 | Karaba et al. | 123/78 B |
| 4,137,873 | A | * | 2/1979 | Caswell, Sr. | 123/78 B |
| 4,469,055 | A | * | 9/1984 | Caswell | 123/78 B |
| 5,769,042 | A | | 6/1998 | Popadiuc | |
| 5,970,944 | A | | 10/1999 | Kawamura | |
| 6,223,703 | B1 | * | 5/2001 | Galvin | 123/48 B |

FOREIGN PATENT DOCUMENTS

| DE | 3021093 | 12/1981 |
|---|---|---|
| GB | 2318151 A | 4/1998 |
| WO | WO 96/34190 | 10/1996 |
| WO | WO 00/77367 A2 | 12/2000 |

* cited by examiner

Primary Examiner—Marguerite McMahon
(74) Attorney, Agent, or Firm—Baker & Daniels (57) ABSTRACT

A piston (11) incorporates spring means acting, in use, between the piston and an associated connecting rod so as to bias the connecting rod away from the crown (112) of the piston. The spring means (117) is integrally formed with the pistons (111) and is configured as a bellows spring.

21 Claims, 12 Drawing Sheets

PISTON

This invention relates to a piston for an internal combustion engine.

A conventional internal combustion engine employs a crankshaft to convert the reciprocating motion of the piston (s) into output torque to propel a vehicle or act upon any other load. The crankshaft is inefficient in its ability to convert the power available from the fuel combustion into usable output torque. This is because combustion of the fuel/air mixture takes place a number of degrees before the top dead centre (TDC) position of the piston, dependent upon engine speed and load. The ignited fuel/air pressure forces cannot produce output torque when the piston is either before or at TDC as the connecting rod and the crank pin are producing reverse torque before TDC and are practically in a straight line at TDC so that there is no force component tangential to the crank circle. This results in most of the available energy being lost as heat. If ignition takes place too early, most of the pressure generated is wasted trying to stop the engine (as this pressure tries to force the piston in the opposite direction to which it is travelling during the compression stroke); and, if left too late, the pressure is reduced due to the increasing volume above the piston as it starts its descent for the power stroke. The optimum maximum pressure point varies from engine to engine, but is around 12° after TDC on average.

The specification of my GB patent 2 318 151 relates to a piston and connecting rod assembly for an internal combustion engine. The assembly comprises a piston, a connecting rod, and a spring, the connecting rod having a first end operatively associated with the piston for movement therewith, and a second end connectible to a rotary output shaft. The spring acts between the piston and the connecting rod to bias the connecting rod away from the crown of the piston. The piston is movable towards the second (small) end of the connecting rod by a distance substantially equal to the cylinder clearance volume height. One result of using a spring is that the assembly has a resonant frequency, the advantages of which are described in the specification of my International patent application WO 00/77367. This assembly will be referred to throughout this specification as an energy storage piston.

In use, ignition is timed, by conventional timing means to take place at a predetermined time before TDC, so that the expanding gases formed by the ignition combustion force the piston to descend rapidly within the cylinder during the power stroke. Prior to reaching TDC, however, the pressure in the cylinder will build up to a high value, and the piston is forced towards the crank pin, against the force of the spring. This compresses the spring, and increases the volume above the piston, causing a reduction in pressure and temperature in the cylinder. The lowered temperature reduces radiation losses and the heat lost to the cooling water and subsequently the exhaust, with the pressure being shared equally between the cylinder clearance volume and the spring. This energy stored in the spring is released when the piston has passed TDC, and leads to the production of increased output torque. This is achieved as the spring pressure is now combined with the cylinder pressure after TDC. A large proportion of this stored energy would otherwise have been lost as heat, owing to the fact that the fuel/air mixture must be ignited before TDC, which is a result of the requirement for the ignited fuel/air to reach maximum pressure by about 12° after TDC for optimum performance.

The assembly of GB patent 2 318 151 preferably uses a stack of disc springs as the spring which acts between the piston crown and the connecting rod. Disc springs are also known as Belleville washers or cone springs. These springs have a conical shape when unstressed, and are flattened against one another when loaded.

Disc springs are typically used in devices such as railway buffers, aircraft landing gear, die presses, etc., i.e. devices that operate relatively infrequently. They may be employed to absorb oscillating motion, but the frequencies they are subjected to, and the duration of those frequencies, are likely to be very low compared with their life cycle in an automobile piston.

A two-stroke engine in a go-kart, for example, operates at up to 20,000 rpm which is 333 cycles per second. To operate at such frequencies in an energy storage piston, the disc springs used have to be built for extremely high endurance.

An average car travels, say 12,000 miles per year, at an average speed of 30 mph. This 30 mph equates to approximately 1,500 rpm. Over a year, this is the equivalent of 36 million operations. Clearly, with this endurance requirement, the springs need to be of superior quality, and should be ideally labelled as 'precision springs'.

One of the problems with the present disc spring designs is that they are produced in two cross-section profiles, namely a rectangular section, or a rectangular section having chamfered, diametrically-opposite bearing faces.

Both of these sections lead to damaging stresses being set up at their abutting edges. In particular, any constraining devices provided to keep the discs aligned, need some clearance to allow the springs to achieve the flat condition without fouling the alignment devices. The inevitable misalignment can cause deep striations in the abutting edges, and will lead to premature failure. The existing chamfered edge design provides contact surfaces for alignment when uncompressed, but introduces alignment problems as compression takes place and the contact surfaces depart from their initial parallel position.

Coupled with the above, when these springs are subjected to a load, their compression causes their inner diameters to decrease and their outer diameters to increase. In their application within a piston, should these springs be axially misaligned before compression then, on being compressed, they can cause a heavy scuffing action on either or both the spring carrier or the cylinder bore, introducing high friction and consequential wear.

The specification of my International patent application WO 00/77367 describes disc springs which are profiled (rounded) so that adjacent contacting surfaces of each pair of adjacent disc springs roll against one another as the stack of disc springs is compressed or decompressed. Although the rounding of the inner and outer circumferences reduces the problems associated with the damaging stresses set up at their abutting edges, it does not solve the problem of spring axial misalignment.

Figure 1:
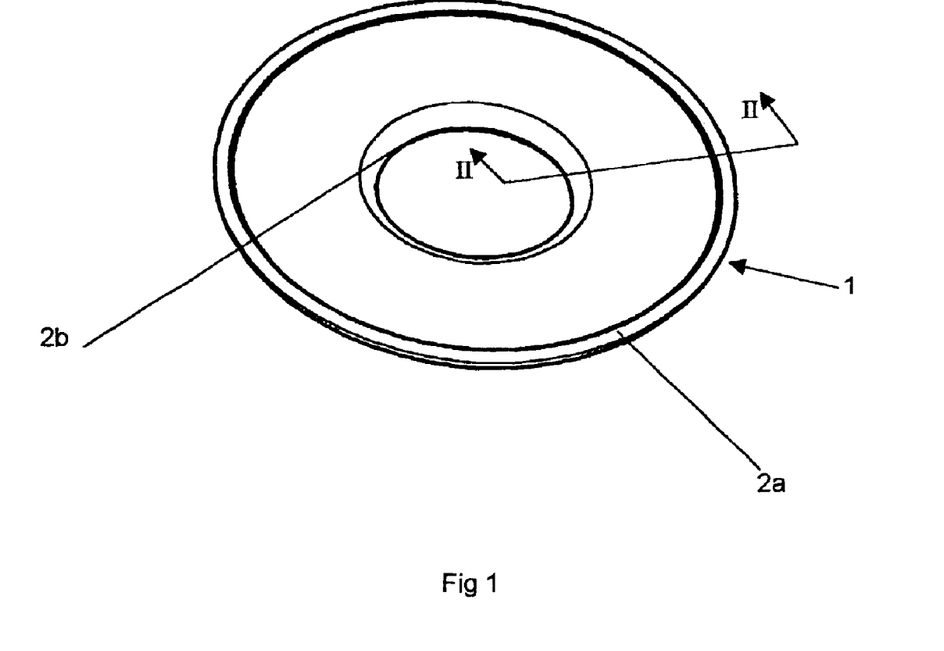
FIG. 1 is a perspective view of a disc spring.
Figure 2:
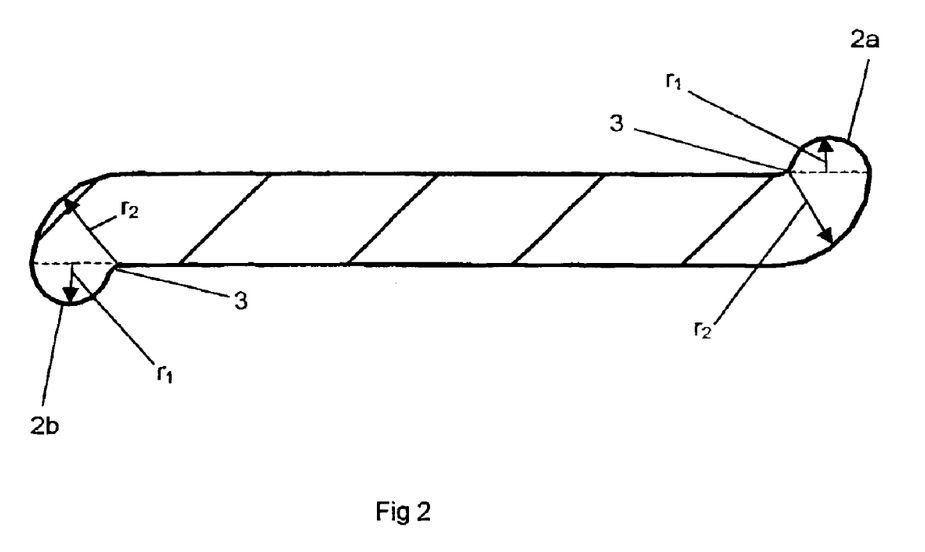
FIG. 2 is an enlarged cross-section taken on the line II—II of FIG. 1.

FIGS. 1 to 4 of the accompanying drawings show a piston and connecting rod assembly having a stack of disc springs which act between the piston and the connecting rod of the assembly, the disc springs being flat when uncompressed and conical when compressed. This arrangement results in a substantial reduction of damaging stresses being set up at the abutting edges of the springs. FIG. 1 shows an annular disc spring 1 made of 6.4 titanium (titanium containing 6% aluminium and 4% vanadium). The outer periphery of the spring 1 is formed with an integral, upstanding protrusion 2a, and the inner annular periphery is formed with an integral, downstanding protrusion 2b. As shown in FIG. 2, each protrusion 2a, 2b has first and second radii $r_1$ and $r_2$, $r_1$ being the radius of the respective protrusion above (or below) the upper (or lower) surface of the spring 1, and $r_2$ being the radius of the curved, outer (or inner) surface of that spring. At the outer periphery of the spring 1, the curved outer surface meets the adjacent flat surface of the spring at a region 3. The radii $r_2$ are each equal to the thickness t of the spring 1, and the radii $r_1$ are each equal to the maximum individual spring deflection.

Figure 3:
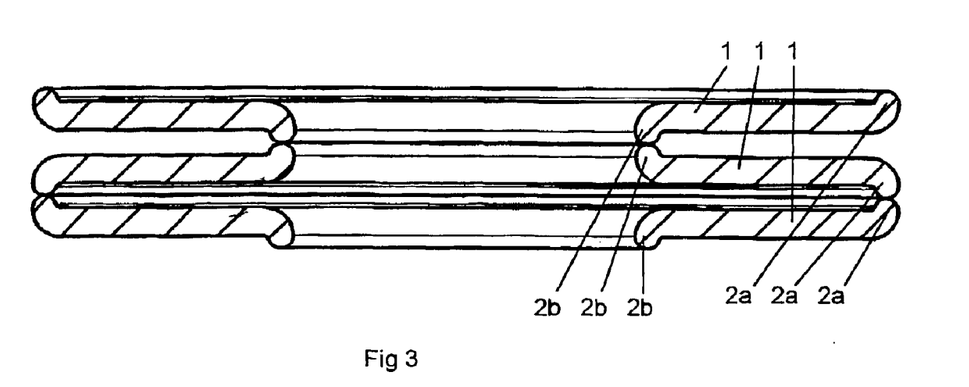
FIG. 3 is a sectional view of a stack of three uncompressed disc springs of the type shown in FIG. 1.
Figure 4:
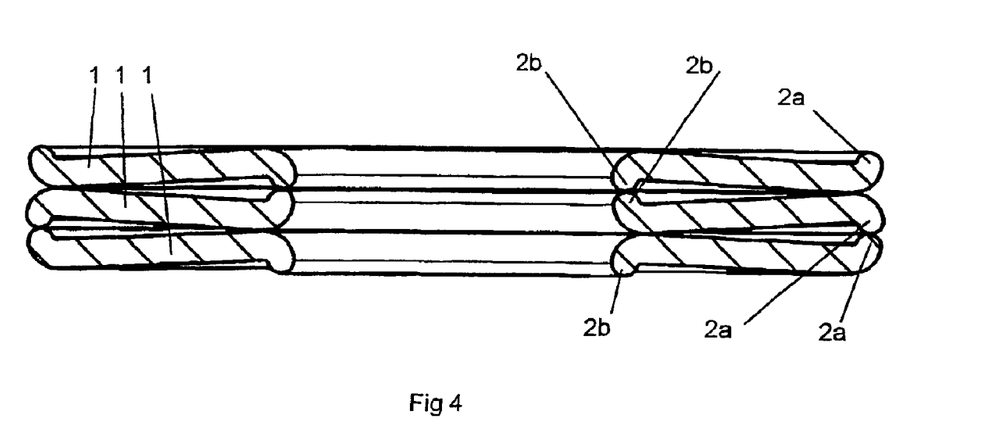
FIG. 4 is a view similar to that of FIG. 3, but showing the disc springs compressed.

FIG. 3 shows a stack of three uncompressed springs 1, the uppermost and lowermost springs being identical to that shown in FIG. 1, and the middle spring being a mirror image thereof, that is to say the middle spring has a downstanding outer protrusion 2a and an upstanding inner protrusion 2b. The inner protrusions 2b of the uppermost and middle springs 1 are in contact, and the outer protrusions 2a of the middle and lowermost springs are in contact. Thus, the lower surface of the uppermost spring 1 is spaced from the upper surface of the middle spring by a distance of $2r_1$, and the lower surface of the middle spring 1 is spaced from the upper surface of the lowermost spring 1 by a distance $2r_1$. When the springs 1 are fully compressed, as shown in FIG. 3, the springs take up a conical configuration with the regions 3 of adjacent springs firmly in contact. In this position, the height of the stack of springs 1 is $6r_1$ less than that of the uncompressed stack (this assumes that the protrusion 2a of the uppermost spring 1 and the protrusion 2b of the lowermost spring 1 are in firm contact with other members which prevent their movement away from the centre of the stack of springs). This height reduction is made up of a height reduction of $2r_1$ between the uppermost and middle springs, a height reduction of $2r_1$ between the middle and lowermost springs, a height reduction of $r_1$ between the uppermost spring and the adjacent member, and a height reduction of $r_1$, between the lowermost spring and the adjacent member.

One problem with the type of energy storage piston of FIGS. 1 to 4, and those disclosed in the above-mentioned patent specifications, is the necessity to have relative movement between the connecting rod small end and the piston crown in order to store energy in the spring arrangement mounted between these two parts. This problem has manifested itself in wear of the spring arrangement and/or adjacent parts, this wear being due to the failure of the assembly to maintain rigid axial alignment between the moving parts. This misalignment can cause heavy wear, and sometimes leads to seizures between adjacent parts, particularly when the piston is on full load.

The aim of the invention is to provide an improved piston, and in particular an improved energy storage piston.

The present invention provides a piston incorporating spring means acting, in use, between the piston and an associated connecting rod so as to bias the connecting rod away from the crown of the piston, the spring means being integrally formed with the piston and being configured as a bellows spring.

Advantageously, the piston further comprises a carrier positioned within the piston, the carrier being connected to the associated connecting rod in such a manner that the spring means permits the crown of the piston to move axially relative to the carrier.

Preferably, the central longitudinal axis of the bellows spring is substantially coincident with the central longitudinal axis of the piston, and the bellows spring is positioned between the piston crown and an annular base.

In a preferred embodiment, the crown and the base extend slightly radially outwardly beyond the circumferential edges of the bellows spring. Preferably, the crown and the base of the piston are sized to leave an annular clearance with the bore of the cylinder lying in the range of from 0.01 mm to 0.015 mm.

Conveniently, at least the circumferential edge portions of the piston crown and base are provided with wear-resistant surfaces, preferably constituted by coatings of a superhard ceramic such as keronite, or by coatings of a titanium oxide such as tinox.

In another preferred embodiment, the piston further comprises a cylindrical sleeve surrounding the bellows spring. Advantageously, the sleeve is sized to leave an annular clearance with the bore of the cylinder lying in the range of from 0.01 mm to 0.015 mm.

Preferably, the sleeve is made of carbon steel that has been hardened and tempered, and has a thicknesss of substantially 1 mm.

The sleeve may be fixed to the piston crown, in which case the carrier may be provided with an external bearing ring for sliding engagement with that end portion of the sleeve remote from that portion fixed to the piston crown. Preferably, the bearing ring is made of a bronze/aluminium alloy.

The piston may be made of a material having substantially the same coefficient of expansion as the material from which a cylinder in which the piston is reciprocally mounted is formed. Preferably, the cylinder bore is formed in steel or cast iron, and the piston is made of titanium.

Advantageously, that portion of the carrier remote from the crown of the piston is fixed to the piston. In this case, said carrier portion may be fixed to the piston by complementary, engaging screw-threaded portions of the carrier and the piston.

Advantageously, the piston further comprises a ring carried by that portion of the carrier adjacent to the piston crown, the ring being a sliding fit within a cylindrical wall formed within the piston adjacent to the crown of the piston. Preferably, the ring is made of a bronze/aluminium alloy.

The carrier may support a gudgeon pin which is connected to the associated connecting rod.

The invention will now be described in greater detail, by way of example, with reference to the drawings, in which.

Figure 5:
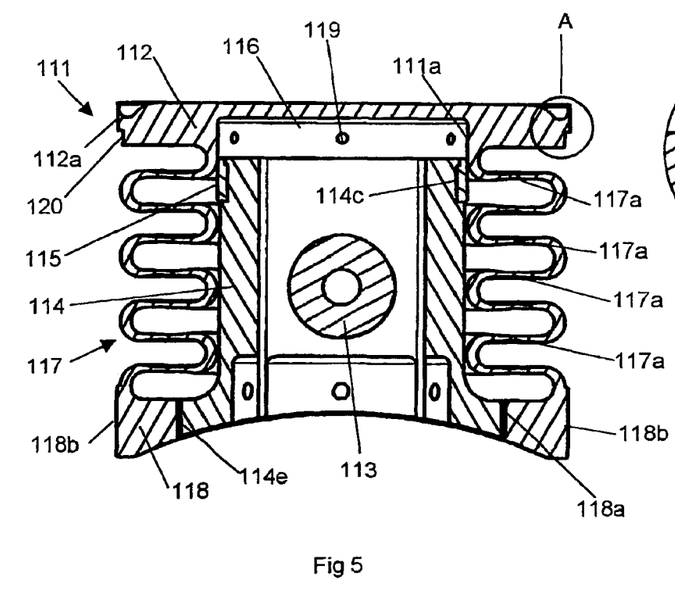
FIG. 5 is a sectional view of a piston constructed in accordance with the invention.
Figure 6:
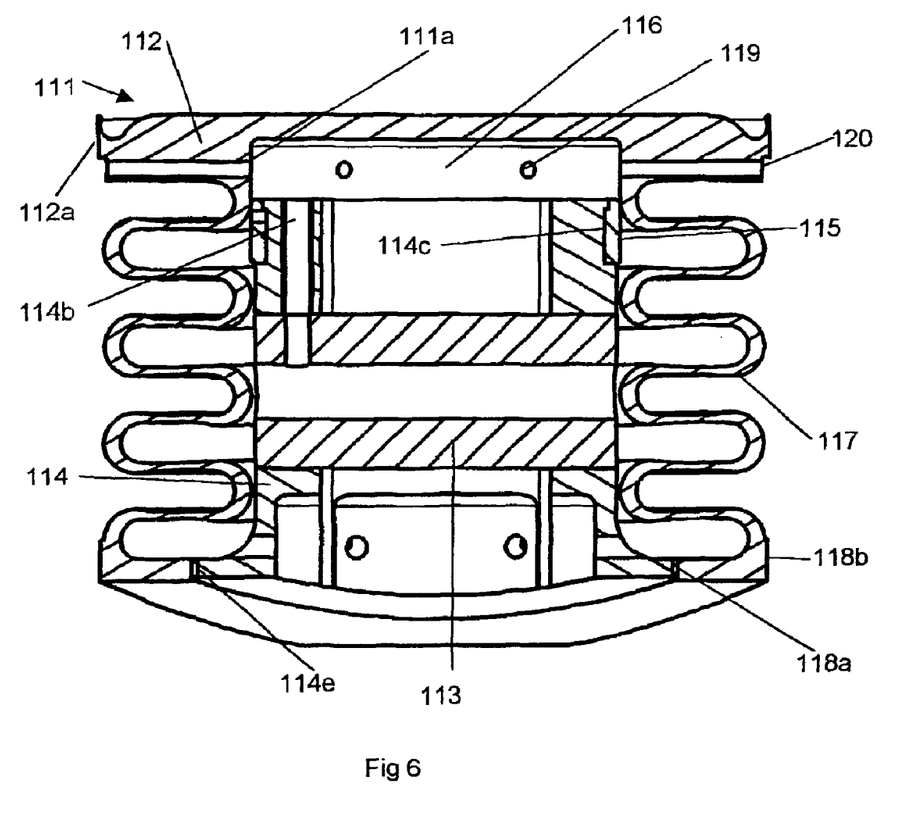
FIG. 6 is a sectional view of the piston of FIG. 5, the section being taken at a right-angle to the section of FIG. 5.
Figure 7:
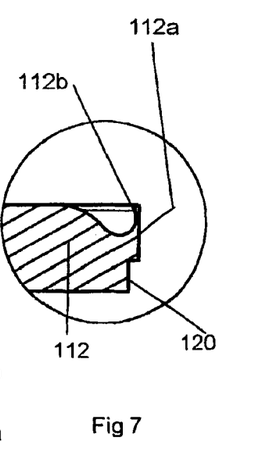
FIG. 7 is an enlarged view of the ringed part A of FIG. 5.
Figure 8:
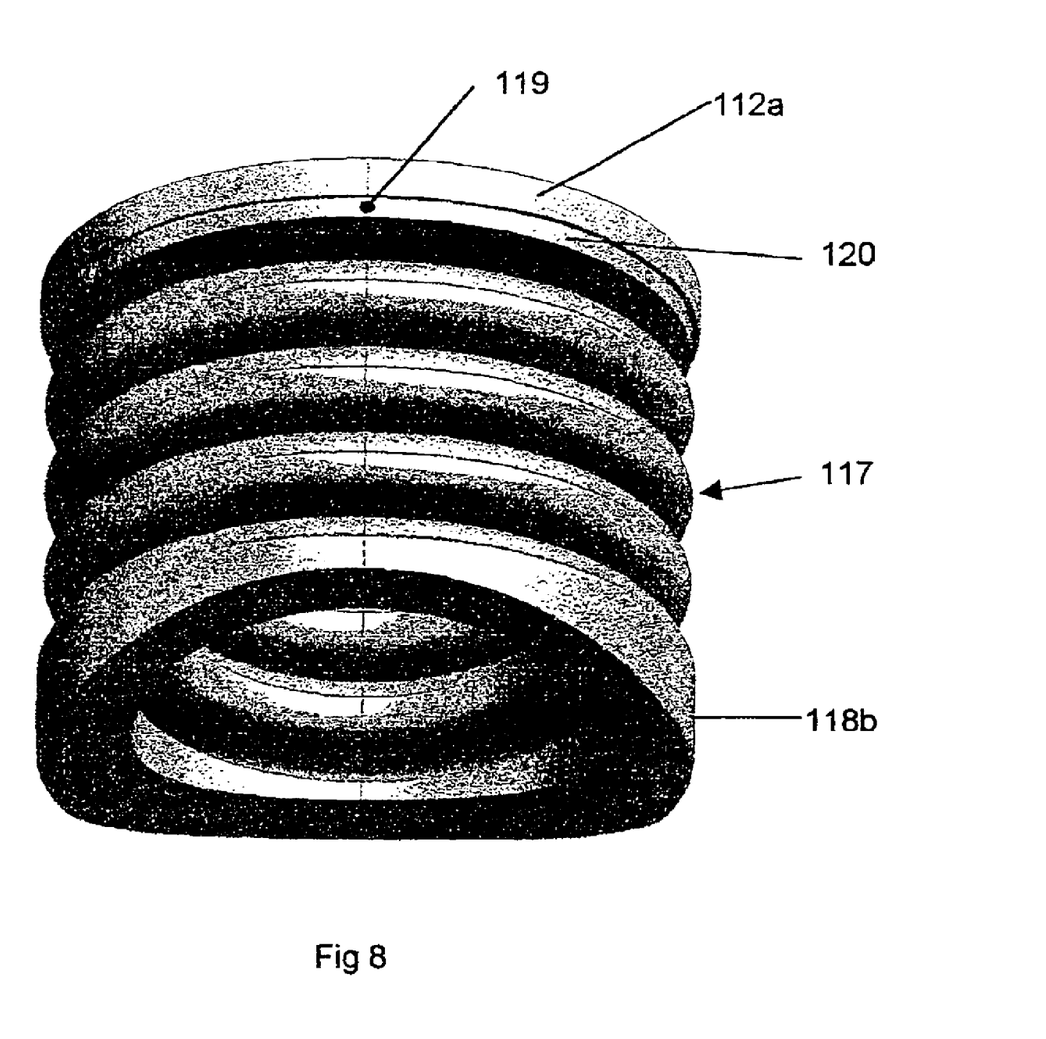
FIG. 8 is a perspective view of the piston body and integral spring of the piston of FIGS. 5 and 6.
Figure 9:
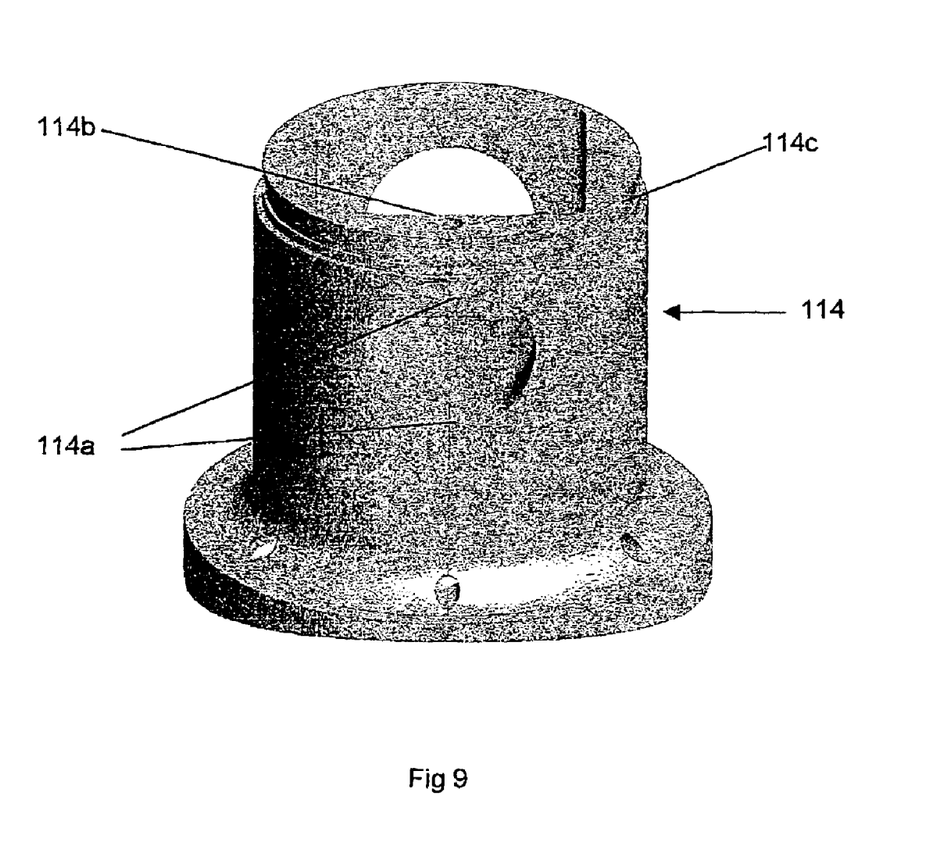
FIG. 9 is a perspective view of a carrier forming part of the piston of FIGS. 5 to 8.
Figure 10:
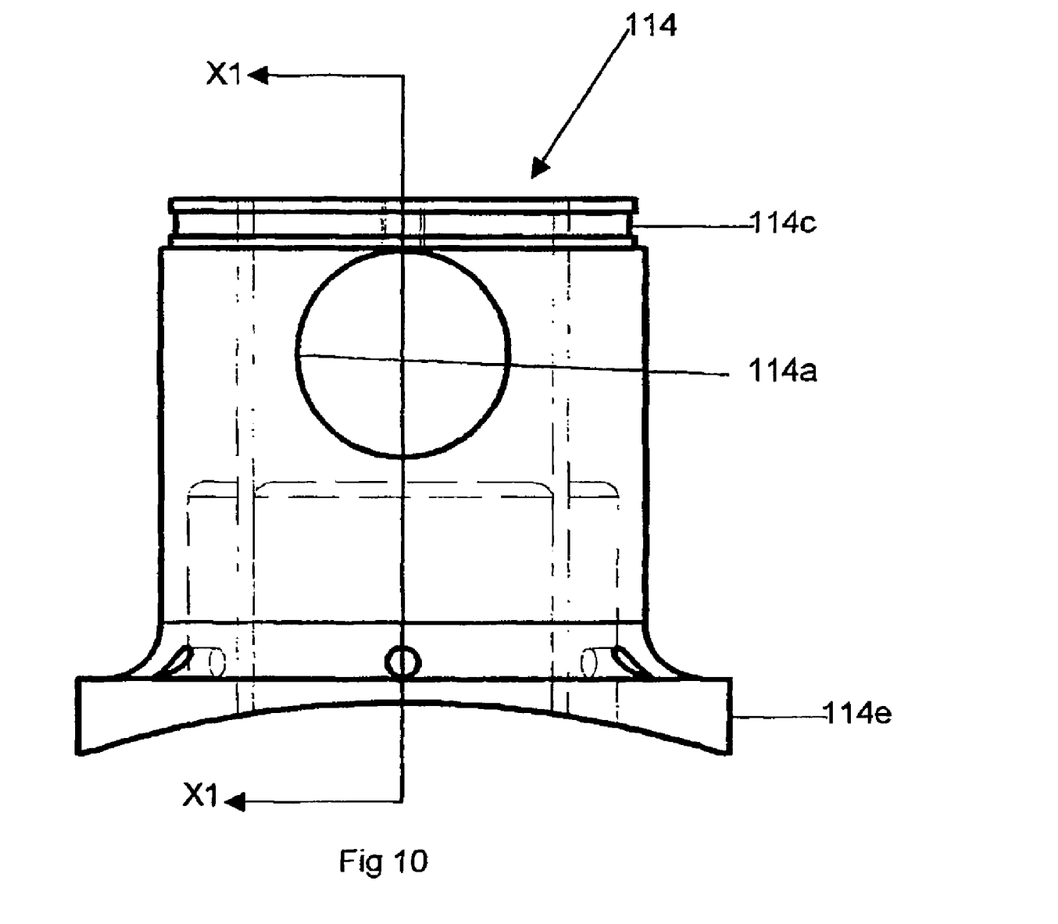
FIG. 10 is a side elevation of the carrier of FIG. 9.
Figure 11:
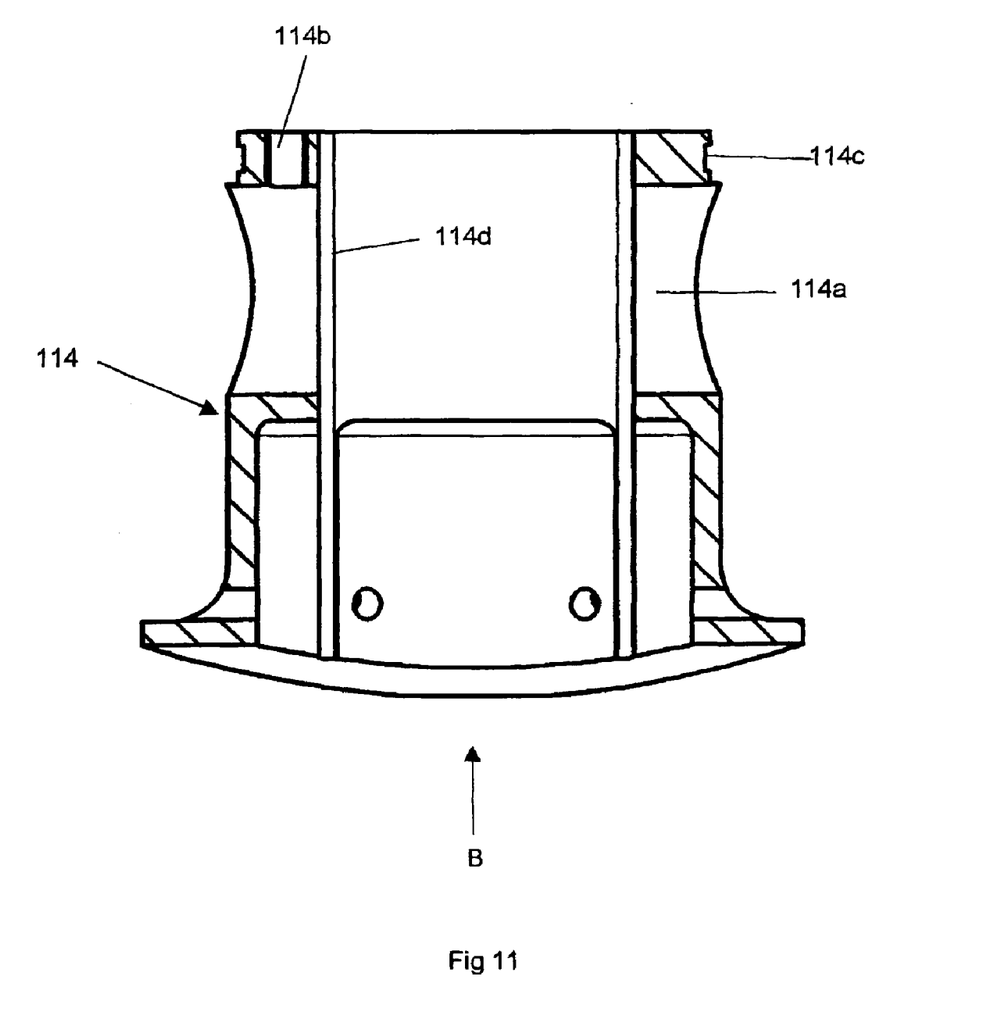
FIG. 11 is a cross-section taken on the line XI—XI of FIG. 10.
Figure 12:
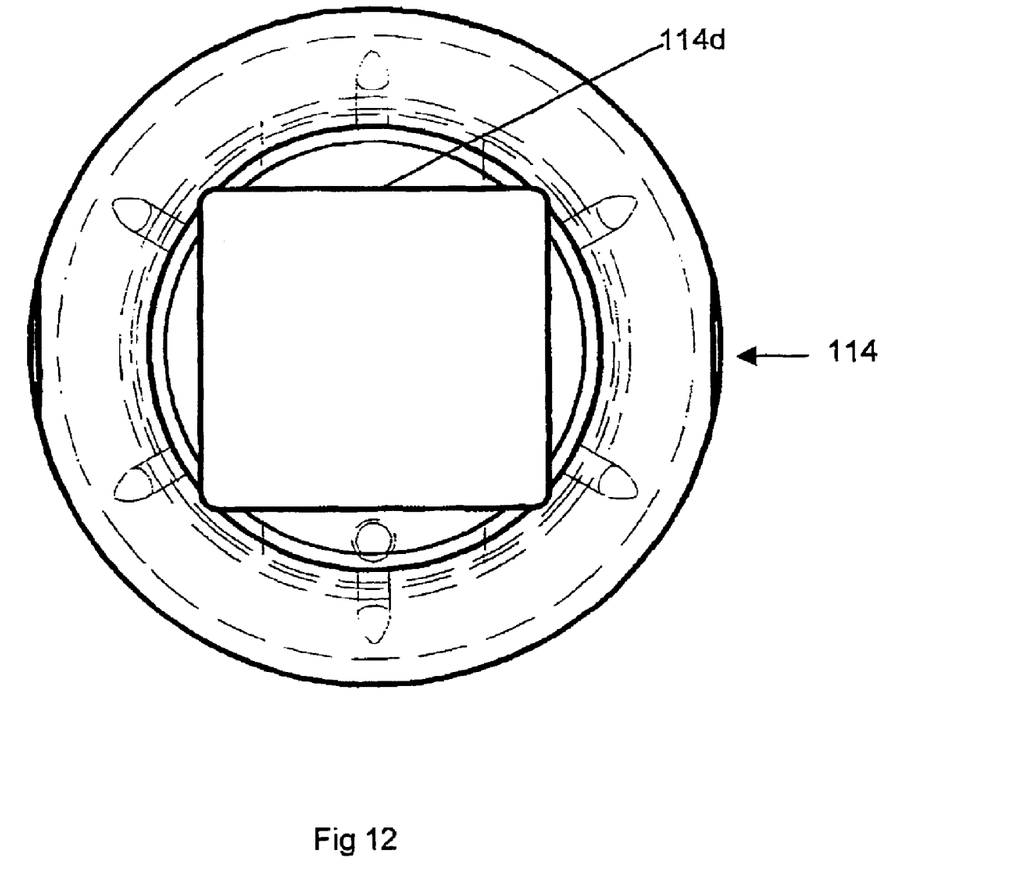
FIG. 12 is a view looking in the direction of the arrow B in FIG. 11.

Referring to the drawings, FIGS. 5 and 6 show a hollow piston 111 of an internal combustion engine, the piston being made of titanium and being reciprocable in a cylinder (not shown) lined with cast iron in a conventional manner. The piston 111 has a crown 112 having a rim 112a. In use, the piston 111 turns a crankshaft (not shown) by means of a gudgeon pin 113, a connecting rod (not shown), and a crank pin (not shown), all of which can be made of titanium, aluminium, steel, a magnesium alloy, a plastics material or any other suitable material. The gudgeon pin 113 is an interference fit within a cylindrical aperture 114a formed within a cylindrical carrier 114 made of titanium or aluminium, and is locked in place by a high tensile screw (not shown) through an aperture 114b in the carrier. This prevents axial rotation and lateral movement of the gudgeon pin 113 within the carrier 114. A split ring 115 made of a bronze/aluminium alloy is fitted into a complementarily-shaped groove 114c in the upper end of the carrier 114, and constitutes a sliding fit with the inner cylindrical wall 111a of the piston 111 below the piston crown 112, thereby delimiting a lubricating chamber 116 formed beneath the piston crown. The chamber 116 is provided to feed lubricating oil to the bearing surfaces of the ring 115 and the inner cylindrical wall 111a of the piston 111.

The connecting rod passes through a generally rectangular aperture 114d formed in the carrier 114, and is connected to the gudgeon pin 113 by a small end bearing (not shown). The rectangular aperture 114d is at right-angles to the cylindrical aperture 114a. A bellows spring 117 is integrally formed with the piston 111, the spring extending between the rim 112a of the crown and a base 118 of the piston. The carrier 114 is formed with an external screw thread 114e at its lower (as seen in FIGS. 5 and 6) end, this screw thread being complementary to an internal screw thread 118a formed within the base 118 of the piston 111. The lower end of the carrier 114 is, therefore, fixed to the base 118 of the piston 111 by interengagement of the screw threads 114e and 118a, but the crown 112 of the piston is axially movable relative to the upper end of the carrier, and hence is relatively movable with respect to the gudgeon pin 113 and the crank pin. The arrangement is such that the piston crown 112 is able to move towards the crank pin by a maximum distance approximately equal to the cylinder clearance volume height (the distance between the mean height of the piston crown 112 and the mean height of the top of the combustion chamber). The spring 117 thus biases the connecting rod away from the piston crown 112.

The spring 117 is mechanically equivalent to seven of the annular disc springs 1 of FIGS. 1 to 4, with adjacent protrusions 2a integrally formed and with adjacent protrusions 2b integrally formed. This spring 117 does, therefore, act in a similar way as a stack of seven annular disc springs 1. This spring 117 does, however, have the additional advantage, arising from its one-piece construction, of improved axial alignment—it not being possible for the spring parts equivalent to the springs 1 to move laterally with respect to one another.

The sliding fit between the ring 115 and the piston wall 111a is lubricated via conventional radial oil holes 119 formed in a recess 120 in the piston wall adjacent to the piston crown 112. Typically, there will be six or eight holes 119, and these allow oil to penetrate into the lubricating chamber 116. The piston 111 itself is lubricated in a conventional manner.

The upper outer rim 112a of the piston crown 112 has a lip 112b integrally formed therewith, the lip being designed such that it is forced outwards by the pressure of the combustion gases on ignition, closing the small gap between the piston 111 and the cylinder wall. As the lip 112b is close to the cylinder wall, its maximum movement will be small, thus preventing undue stresses at its thinnest point, thus allowing the dissipation of heat from this part to the cylinder wall. As the pressure in the cylinder falls during the descent of the piston 111, the lip 112b will move away from the cylinder, thus reducing its friction with the wall. On the induction and exhaust strokes, the lip 112b will not be in firm contact with the cylinder wall at all, reducing the friction to well below that which would have been experienced by conventional piston rings. However, a conventional piston ring or rings could be provided if required.

The outer rim 112a of the piston crown 112 and the outer rim 118b of the base 118 of the piston 111 extend slightly radially outwardly beyond the circumferential edges of the bellows spring 117. Consequently, only the rims 112a and 118b contact, in use, the cylinder wall. At least the surfaces of the rims 112a and 118b are provided with a wear-resistant coating of a superhard ceramic such as keronite (RTM), or with a titanium oxide such as tinox, thereby to reduce wear on the piston 111 as it contacts the cylinder wall. In practice, however, the entire outer surface of the piston 111 may be treated with such a wear-resistant coating.

As mentioned above, the bellows spring 117 can be thought of as a stack of seven annular disc springs of the type shown in FIGS. 1 to 4. Accordingly, the "springs" (the generally horizontal portions 117a of the bellows spring 117 as shown in FIG. 5) are generally parallel when uncompressed, and take up conical configurations when compressed. The spring 117 thus has the same advantages of the spring arrangements described with reference to FIGS. 1 to 4.

In use, ignition is timed, by conventional timing means (not shown), to take place at a predetermined time before TDC, so that the expanding gases formed by the ignition combustion force the piston 111 to descend rapidly within the cylinder during the power stroke. Prior to reaching TDC, however, the pressure in the cylinder will build up to a high value, and the piston 111 is forced towards the crank pin, against the force of the bellows spring 117, with respect to the carrier 114. This compresses the bellows spring 117, and increases the volume above the piston 111, causing a reduction in pressure and temperature in the cylinder.

As the spring 117 is compressed, it opposes the forces being applied due to its stiffness, this stiffness being measured in Newtons/metre displacement. The more "springs" 117a there are in the bellows spring 117, the greater the deflection of the spring for a given load. The bellows spring 117 is designed for endurance, by arranging that the spring section is such that the stresses within the spring when compressed are distributed optimally through the spring to avoid areas of high concentration. This results in a spring cross-section such that at no point in any "spring" 117a are two opposite faces parallel.

The lowered temperature which results from the compression of the spring 117 reduces radiation losses and the heat lost to the cooling water and subsequently the exhaust, with the pressure being shared equally between the cylinder clearance volume and the spring 117. This energy stored in the spring 117 is released when the piston 111 has passed TDC, and leads to the production of increased output torque. This is achieved as the energy released by the spring is now combined with the cylinder pressure after TDC. A large proportion of this stored energy would otherwise have been lost as heat, owing to the fact that the fuel/air mixture must be ignited before TDC, which is a result of the requirement for the ignited fuel/air to reach maximum pressure by about 12° after TDC for optimum performance.

The action of this arrangement means that, when the engine is firing normally, there will be movement of the piston 111 with respect to the connecting rod (and hence to its crank pin) on every power stroke. The ignition timing of the engine is such that ignition occurs between approximately 10° and 40° before TDC, depending upon the engine's load and speed.

One effect of providing the energy storing spring 117 is to reduce considerably the engine fuel consumption without reducing its power output. A minimum of 30% improvement can be achieved without a compression ratio adjustment, and up to 60% with compression ratio adjustment.

Not only is the efficiency of the engine improved, but the exhaust emissions are also reduced. Thus, by decreasing the fuel consumption, the quantity of emissions is reduced; by lowering the temperature of combustion (in the non-increased compression ratio case), the nitrous oxide emissions are greatly reduced; and, by increasing the efficiency of the engine, unburnt hydrocarbon emissions are reduced.

In a standard internal combustion engine, an exhaust valve is usually opened before the associated piston reaches bottom dead centre (BDC) to allow the continuing expanding gases to rush out of the exhaust, thereby assisting the entrance of a fresh charge of fuel and air into the cylinder during valve overlap (that is to say when both the inlet and outlet valves are open), such that the exhaust gases are effectively scavenged from the combustion chamber. The act of opening the exhaust valve early promotes the emission of unburnt hydrocarbons, and prevents the continuing expanding gases from providing mechanical rotation of the crankshaft, as these gases are vented to atmosphere. The use of the spring 117, however, not only allows more efficient use of the fuel/air mixture, but, if used with an increased compression ratio, allows the use of a cam shaft designed such that the exhaust valve remains closed until almost BDC. The clearance volume in the cylinder will, therefore, be considerably reduced, thereby effectively clearing most of the exhaust gases from the combustion chamber without the need to release the pressure in the cylinder by opening the exhaust valve early. This late opening of the exhaust valve cam design can be applied advantageously to any engine utilising the spring 117.

The use of the spring 117, coupled with the mass of the engine's flywheel, gives the whole assembly a frequency (rpm) at which it is resonant. This could be used to advantage when employed in an engine designed to run at a constant speed.

The principle of increasing engine efficiency and reducing exhaust emissions is described in the specification of my GB patent 2 318 151. Unfortunately, as mentioned above, the disc springs described in that specification have disadvantages which arise from the springs being conical when uncompressed and flat when compressed. However, the stack of disc "springs" 117a which constitute the bellows spring 117 is such that each of the "springs" is flat when uncompressed and conical when compressed. As the "springs" 117a are compressed, their outer peripheral edges move inwards away from the piston bore, and their inner peripheral edges move outwards away from the carrier 114, thereby avoiding any tendency for the springs to scuff either the piston bore or the carrier.

The piston 111 described above thus has all the advantages of the piston described above with reference to FIGS. 1 to 4. Moreover, because the energy storage spring 117 is integrally formed with the piston 111, it is of unitary construction. Furthermore, as the piston 111 is made of titanium, which has a coefficient of linear expansion of $9 \times 10^{-6}/°$ C., the piston can be mounted within its cylinder bore with a smaller clearance than is normal, thereby reducing the chances of axial misalignment during relative movement between the connecting rod small end and the piston crown 112 as the spring 117 expands and contracts.

A further simplification of the piston 111 results from the fact that the coefficient of linear expansion ($9 \times 10^{-6}/°$ C.) of titanium is very similar to that ($12 \times 10^{-6}/°$ C.) of the steel in which the associated cylinder is bored. The piston 111 does not, therefore, need to be provided with piston rings which are conventionally required for sealing the gap between the piston and the cylinder to prevent gas leakage. In this connection, it will be appreciated that a conventional piston made of aluminium needs a substantial clearance between its outer cylindrical wall and the inner cylindrical wall of the associated cylinder, because aluminium has a coefficient of linear expansion of $18 \times 10^{-6}/°$ C. An aluminium piston also needs piston rings, and the piston body needs to be barrelled and to have skirt ovality. The titanium piston 111 needs no piston rings, and can be machined concentric with the cylinder bore. In other words, the piston 111 can be made to fit closely within the cylinder bore without fear of seizure on overheating. The titanium piston 11 would be heat treated for strength, oxide coated to reduce friction and galling, and shot peened for increased endurance.

A further advantage of the piston 111 described above is that the carrier 114 is firmly held in axial alignment within the piston body. Thus, when a non-axial load is imparted to the carrier 114 due to the departure of the connecting rod from axial alignment with the piston 111, the carrier will be subject to a substantial sideways thrust. Because of the close fit of the piston 111 within the cylinder bore, the screw-threaded connection of the carrier 114 within the piston body, and the close sliding fit between the ring 115 and the piston wall 111a, the carrier is maintained firmly in axial alignment with the piston body. Consequently, the piston 111 has substantially improved resistance to wear than the piston of FIGS. 1 to 4. Moreover, as the lubricating chamber 116 is fed with oil, via the oil holes 119, the movement of the ring 115 within the chamber is lubricated on every power stroke and every induction stroke Additional advantages of using titanium, suitably treated, are:

1. Although titanium is more dense than aluminium, less actual material is required because of its superior strength, so that the piston 111 is comparable in weight with an aluminium piston design.

2. Using titanium eliminates the need for the piston barrelling and ovality that is necessary in the machining of an aluminium piston, thereby cutting some machining time and cost.

3. The problem with galling experienced with untreated titanium can be eliminated by surface treatment, such that the coefficient of friction when oil lubricated is less than that of oil-lubricated carbon steel.

4. By combining the spring 117 with the piston case, a greater volume of spring can be utilised, thereby greatly reducing the full load stress figures, hence extending its endurance.

Although the energy storage piston described above forms part of an internal combustion engine, it will be apparent that it could be used, with advantage, in other devices such as a compressor for a refrigerator or a pump. The action of a reciprocating compressor is such that the compression stroke is the working stroke, and the energy input is typically by an electric motor. In an air compressor, for example, the maximum work is done at around 80° to 100° before TDC, when the crank arm is substantially normal to the connecting rod. At this position, the compressed gas pressure will be relatively low (approximately 50% of maximum), because the volume of the compression chamber is still relatively high. When the piston is nearing TDC, however, its ability to do work is greatly reduced, but the pressure and temperature are both at a maximum. The outlet valve of the compressor would have opened before TDC, but energy would have been lost as heat to the cylinder walls at this time.

If a suitably designed energy storage piston with a composite bellows spring is fitted into this compressor, however, energy would be stored in the spring at around 80° to 100° before TDC, thereby reducing the temperature and pressure of the gas, and hence reducing the energy lost as heat to the cylinder walls and reservoir. The spring would discharge its energy by propelling the gas into the reservoir at around TDC, when the crank arm compressive movement is the least.

Moreover, it can be seen that the piston spring, working in conjunction with the rotating inertial mass (of the flywheel, crank etc), will have an rpm at which they are resonant. By matching the rpm of the drive motor to the resonant rpm, the assembly will run at its optimum efficiency of at least 30% above that of a standard compressor.

Figure 13:
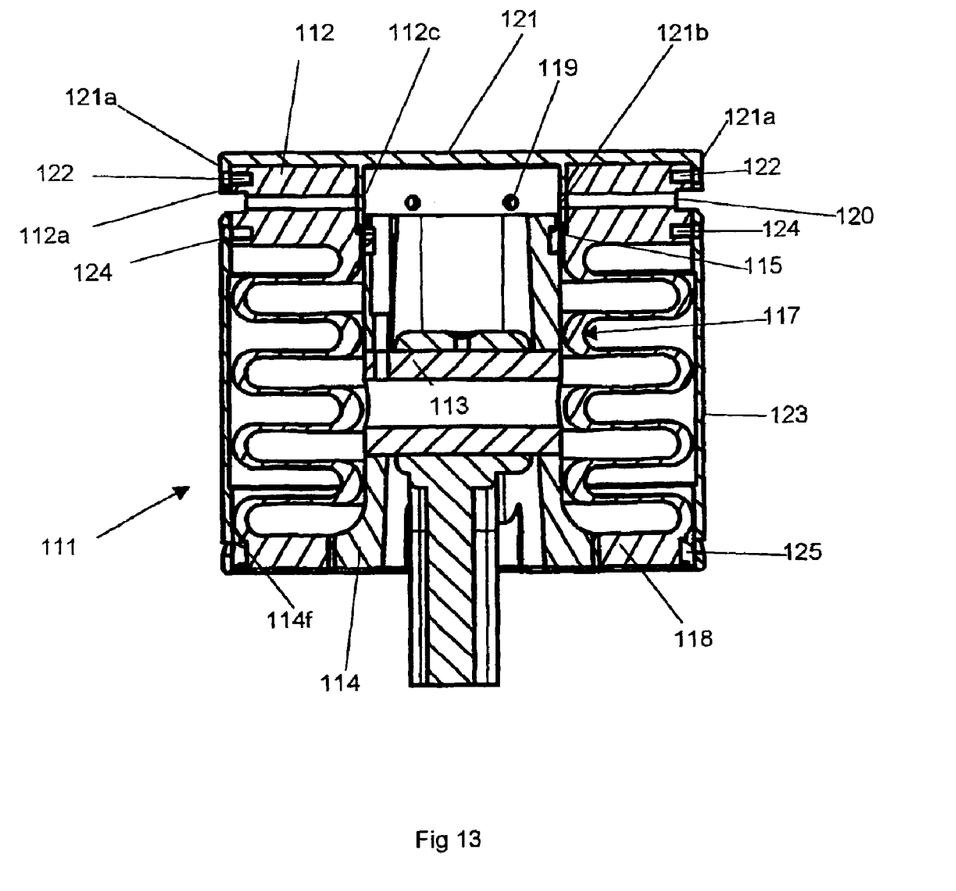
FIG. 13 is a sectional view, similar to that of FIG. 6, of a modified form of the piston of FIGS. 5 to 12.

FIG. 13 shows a modified form of the piston described above with reference to FIGS. 5 to 12. This piston is similar to that of FIGS. 5 to 12, so like reference numerals will be used for like parts, and only the modifications will be described in detail. The crown 112 of the titanium piston 111 of FIG. 13 is apertured, as indicated by the reference numeral 112c. This apertured region 112c is covered by a lid 121 made of carbon steel that has been tempered and hardened. The lid 121 has a downwardly-extending, integrally-formed peripheral flange 121a which is a close fit over the rim 112a of the crown 112. The lid 121 is fixed to the piston crown 112 by means of screws 122 which pass through aligned apertures in the flange 121a and the rim 112a. The lid also has a downwardly-extending, integrally-formed annular flange 121b which is a close fit within the apertured region 112c of the crown 112. In use, the flange 121b slides against the ring 115 when the crown moves relative to the carrier 114. The lid 121 has a thickness of 3 mm, and the flanges 121a and 121b each have a thickness of 1 mm. The apertured piston crown 112 facilitates manufacture of this piston 111, as it facilitates access to the interior of the piston for fitting internal components.

The other main difference between this piston and that of FIGS. 5 to 12, is the provision of a cylindrical sleeve 123 around the bellows spring 117 and the base 118 of the piston 111. The sleeve 123 is made of carbon steel that has been tempered and hardened, and has a thickness of 1 mm. The sleeve 123 is fixed to the piston 111 by means of screws 124 passing through aligned apertures in the upper portion of the sleeve and the lower portion of the piston crown 112. The lower, internal edge of the sleeve 123 is a sliding fit against a split ring 125 which is made of a bronze/aluminium alloy and is fitted into a complementarily-shaped groove 114f formed in the lower, outer circumferential portion of the carrier 114. In use, the ring 125 and the lower internal edge of the sleeve constitute a sliding bearing to prevent wear to the titanium piston 111 when it moves relative to the carrier 114. The outer cylindrical surface of the sleeve forms a bearing surface for contact with the cylinder wall, thereby preventing wear to the titanium piston 111. The sleeve 123, being only 1 mm in thickness serves only as a bearing surface to protect the titanium piston 111 against wear, and takes no part in the transmission of longitudinal forces.

It will be apparent that modifications could be made to the piston described above. For example, the bellows spring 117 could be formed from a different number of "springs" 117a, and the piston could be arranged within a cast iron cylinder.

What is claimed is:

1. A piston and connecting rod assembly for an internal combustion engine, the assembly comprising a piston, a connecting rod and a carrier, the connecting rod having a first end operatively associated with the piston for movement therewith, and a second end connectible to a rotary output shaft, wherein a bellows spring is integrally formed with the piston, the spring acting to bias the connecting rod away from the crown of the piston, the carrier being connected to the first end of the connecting rod in such a manner that the bellows spring permits the crown of the piston to move axially relative to the carrier, and wherein at least a portion of the carrier is positioned within the bellows spring and is configured in such a manner as to hold the carrier firmly in alignment with the axis of the piston, that portion of the carrier remote from the crown of the piston being fixed to the piston, and that portion of the carrier adjacent to the piston crown carries a ring which is a sliding fit within a cylindrical wall formed within the piston adjacent to the crown of the piston, the sliding fit of the ring within said cylindrical wall and the fixing between said portion of the carrier and the piston constituting the alignment means wherein the crown and an annular base extend slightly radially outwardly beyond the circumferential edges of the bellows spring.

2. A piston as claimed in claim 1, wherein the portion of the carrier within the spring is configured to extend substantially the entire length of the bellows spring closely adjacent to its internal curved walls.

3. A piston as claimed in claim 2, wherein the bellows spring is positioned between the piston crown and the annular base.

4. A piston as claimed in claim 1, wherein the crown and the base of the piston are sized to leave an annular clearance with the bore of the cylinder lying in the range of from 0.01 mm to 0.015 mm.

5. A piston as claimed in claim 1, wherein at least the circumferential edge portions of the piston crown and base are provided with wear-resistant surfaces.

6. A piston as claimed in claim 5, wherein said wear-resistant surfaces are constituted by coatings of a superhard ceramic.

7. A piston as claimed in claim 6, wherein said superhard ceramic is keronite.

8. A piston as claimed in claim 5, wherein said wear-resistant surfaces are constituted by coatings of a titanium oxide such as tinox.

9. A piston as claimed in claim 1, further comprising a non-load-bearing cylindrical sleeve surrounding the bellows spring.

10. A piston as claimed in claim 9, wherein the sleeve is sized to leave an annular clearance with the bore of the cylinder lying in the range of from 0.01 mm to 0.015 mm.

11. A piston as claimed in claim 9, wherein the sleeve is made of carbon steel that has been hardened and tempered.

12. A piston as claimed in claim 9, wherein the sleeve has a thickness of substantially 1 mm.

13. A piston as claimed in claim 9, wherein the sleeve is fixed to the piston crown.

14. A piston as claimed in claim 1, wherein said carrier portion is fixed to the piston by complementary, engaging screw-threaded portions of the carrier and the piston.

15. A piston as claimed in claim 1, wherein the ring is made of a bronze/aluminum alloy.

16. A piston as claimed in claim 1, wherein the carrier supports a gudgeon pin which is connected to the associated connecting rod.

17. A piston as claimed in claim 9, wherein the carrier is provided with an external bearing ring for sliding engagement with that end portion of the sleeve remote from that portion fixed to the piston crown.

18. A piston as claimed in claim 17, wherein the bearing ring is made of a bronze/aluminum alloy.

19. A piston as claimed in claim 1, wherein the piston is made of a material having substantially the same coefficient of expansion as the material from which a cylinder in which the piston is reciprocally mounted is formed.

20. A piston as claimed in claim 19, wherein, where the cylinder bore is formed in steel or cast iron, the piston is made of titanium.

21. A piston and connecting rod assembly for an internal combustion engine, the assembly comprising a piston, a connecting rod and a carrier, the connecting rod having a first end operatively associated with the piston for movement therewith, and a second end connectible to a rotary output shaft, wherein a bellows spring is integrally formed with the piston, the spring acting to bias the connecting rod away from the crown of the piston, the carrier being connected to the first end of the connecting rod in such a manner that the bellows spring permits the crown of the piston to move axially relative to the carrier, and wherein at least a portion of the carrier is positioned within the bellows spring and is configured in such a manner as to hold the carrier firmly in alignment with the axis of the piston wherein the crown and an annular base of the piston extend slightly radially outwardly beyond the circumferential edges of the bellows spring.

* * * * *